United States Patent
Wei

(10) Patent No.: US 9,891,505 B1
(45) Date of Patent: Feb. 13, 2018

(54) PANORAMIC CAMERA STABILIZER

(71) Applicant: Chengyun Wei, Guangxi (CN)

(72) Inventor: Chengyun Wei, Guangxi (CN)

(*) Notice: Subject to any disclaimer, the term of this patent is extended or adjusted under 35 U.S.C. 154(b) by 0 days.

(21) Appl. No.: 15/405,337

(22) Filed: Jan. 13, 2017

(30) Foreign Application Priority Data

Nov. 22, 2016 (CN) .......................... 2016 1 1047202
Nov. 22, 2016 (CN) ..................... 2016 2 1268361 U

(51) Int. Cl.
*G03B 17/56* (2006.01)
*G03B 37/00* (2006.01)
*F16M 13/02* (2006.01)

(52) U.S. Cl.
CPC ........... *G03B 17/561* (2013.01); *F16M 13/02* (2013.01); *G03B 17/563* (2013.01); *G03B 37/00* (2013.01)

(58) Field of Classification Search
USPC ........................................................ 396/421
See application file for complete search history.

(56) References Cited

U.S. PATENT DOCUMENTS

| | | | | |
|---|---|---|---|---|
| 7,588,376 B2* | 9/2009 | Friedrich | ............. | F16M 11/043 248/183.2 |
| 7,936,984 B2* | 5/2011 | Greb | ...................... | F16M 13/04 396/421 |
| 9,574,703 B2* | 2/2017 | Firchau | ................ | F16M 11/041 |
| 2004/0184798 A1* | 9/2004 | Dumm | ................... | F16M 11/10 396/428 |
| 2016/0352992 A1* | 12/2016 | Saika | ................... | H04N 5/2328 |

* cited by examiner

Primary Examiner — Clayton E Laballe
Assistant Examiner — Linda B Smith

(57) ABSTRACT

The invention relates to photographic equipment field and provides a panoramic camera stabilizer suitable for panoramic camera to shoot steadily from any angle, which comprises a fixing assembly, a rotating component and a handle. The fixing assembly is connected with and arranged above the rotating component for mounting a panoramic camera, the rotating component is connected to handle end and comprises a first adjustment mechanism for adjusting pitching angle of the fixing assembly, a second adjustment mechanism for adjusting rolling angle of the fixing assembly, and a third adjustment mechanism for adjusting yawing angle of the fixing assembly. The fixing assembly is arranged at upper part of the stabilizer, thereby avoiding blocking camera lens. Due to multi-direction adjustable rotating component, the panoramic camera may capture images at any angle. By adjusting gravity center through the counterweight and fixing assembly, cameras in different sizes and weights may be mounted.

8 Claims, 1 Drawing Sheet

PANORAMIC CAMERA STABILIZER

CROSS-REFERENCE TO RELATED APPLICATION

This application claims the benefit of Chinese Patent Application No. 201611047202.7 filed on Nov. 22, 2016 and Chinese Utility Model Application No. 201621268361.5 filed on Nov. 22, 2016, the entire content of which is hereby incorporated by reference.

FIELD OF THE INVENTION

The present invention relates to the stabilizer, more particularly to a panoramic camera stabilizer.

BACKGROUND OF THE INVENTION

The stabilizer is a supporting platform for cameras. When the camera is mounted on the stabilizer, images can be well captured because the lens of the camera can be well adjusted via controlling the stabilizer. The panoramic camera is used for wide range and multi-angle shooting of images and videos, so a suitable stabilizer should provide an adjustable shooting angle without blocking the lens.

Now, the conventional stabilizer mainly includes a base part, a telescopic rod and a holder assembly. Herein, the components are locked by threads, which results in inconvenient adjustment after assembly. Besides, when the panoramic camera is used for omnidirectional shooting, the conventional stabilizers are not suitable for it because some parts of the conventional stabilizers will obscure the view and limit shooting angel.

SUMMARY OF THE INVENTION

The present invention aims to overcome the problem of the limitation in shooting angle of the panoramic camera mounted on the existing stabilizer with structural weakness.

To achieve the above object, the present invention provides a panoramic camera stabilizer, comprising a fixing assembly, a rotating component and a handle, wherein the fixing assembly is used for mounting a panoramic camera, the rotating component is connected to an end of the handle, the fixing assembly is connected with the rotating component and is arranged above the rotating component, and the rotating component comprises a first adjustment mechanism for adjusting a pitching angle of the fixing assembly, a second adjustment mechanism for adjusting a rolling angle of the fixing assembly, and a third adjustment mechanism for adjusting a yawing angle of the fixing assembly.

Preferably, the first adjustment mechanism comprises a pitching motor, the second adjustment mechanism comprises a rolling motor, and the third adjustment mechanism comprises a yawing motor, wherein a stator of the pitching motor is fixedly connected with the handle, a rotor of the pitching motor is fixedly connected with a stator of the rolling motor via a first connecting arm, a rotor of the rolling motor is fixedly connected with a stator of the yawing motor via a second connecting arm, a rotor of the yawing motor is fixedly connected with the fixing assembly via a third connecting arm.

Preferably, the panoramic camera stabilizer further comprises a control unit, wherein the control unit is used for controlling the movement postures of the first adjustment mechanism, the second adjustment mechanism and the third adjustment mechanism.

Preferably, the control unit comprises a control board and a posture board, wherein the control board is connected with the first adjustment mechanism, the second adjustment mechanism and the third adjustment mechanism, respectively, the posture board is connected with the fixing assembly, the control board is used for controlling the movement postures of the first adjustment mechanism, the second adjustment mechanism and the third adjustment mechanism, and the posture board is used for detecting the posture information of the fixing assembly.

Preferably, the fixing assembly comprises a fixing mechanism, a longitudinal adjustment mechanism and a transverse adjustment mechanism, wherein the fixing mechanism is used for mounting a camera, the fixing mechanism is longitudinally slidable relative to the longitudinal adjustment mechanism, and the longitudinal adjustment mechanism is transversely slidable relative to the transverse adjustment mechanism.

Preferably, the fixing mechanism comprises a fixing plate provided with a mounting groove for fixing the panoramic camera, wherein the mounting groove is provided with a through hole on the lateral side, and a fastening screw is arranged in the through hole, and the fixing plate is provided with a first guide rail at the bottom;

the longitudinal adjustment mechanism comprises a longitudinal adjustment plate, the longitudinal adjustment plate is provided with a first recess for accommodating the first guide rail of the fixing plate, the longitudinal adjustment plate is provided on the lateral side with a first locking block and a first locking screw for locking the first guide rail and the first recess, and the longitudinal adjustment plate is provided with a second guide rail at the bottom;

the transverse adjustment mechanism comprises a transverse adjustment plate, the transverse adjustment plate is provided with a second recess for accommodating the second guide rail of the longitudinal adjustment plate, the transverse adjustment plate is provided on the lateral side with a second locking block and a second locking screw for locking the second guide rail and the second recess.

Preferably, the rotating component is L-shaped.

Preferably, the stator of the yawing motor is fitted with a counterweight, by which in combination with the longitudinal adjustment mechanism and the transverse adjustment mechanism, the center of gravity may be adjusted, so as to facilitate mounting of panoramic cameras in different sizes and weights.

Preferably, the handle is provided with a button board, a built-in battery, a four-direction navigation key, a function button, a shutter button, an indicator light, and a USB port.

Preferably, the control board comprises a micro control unit and a motor control circuit, a magnetic encoder and a serial communication circuit which are connected with the micro control unit, wherein the magnetic encoder detects rotational angle and rate variation signals of the motors and sends these signals to the micro control unit through the serial communication circuit, then the micro control unit performs corresponding process according to the signals and controls the movement postures of the first adjustment mechanism, the second adjustment mechanism and the third adjustment mechanism through the motor control circuit.

The panoramic camera stabilizer provided in the present invention comprises a fixing assembly connected with the rotating component and arranged above it. During using, the panoramic camera may be fixedly mounted on the top of the fixing assembly, so the stabilizer will not block the panoramic camera view. Besides, due to the multi-direction adjustable rotating component, the panoramic camera may capture images at any angle. Moreover, since the stabilizer is provided with a counterweight, the center of gravity may be adjusted through the counterweight and the fixing assembly, allowing mounting of panoramic cameras in different weights and sizes on the stabilizer.

In the figures: 1. fixing assembly; 1-1. fixing mechanism; 1-2. longitudinal adjustment mechanism; 1-3. transverse adjustment mechanism; 2. rotating component; 2-1. a pitching motor; 2-2. rolling motor; 2-3. yawing motor; 3. handle; 4. first connecting arm; 5. second connecting arm; 6. third connecting arm; 7. cushion; 8. first locking block; 9. first locking screw; 10. second locking block; 11. second locking screw; 12. counterweight; 13. four-direction navigation key; 14. function button; 15. shutter button; 16. indicator light; 17. USB port.

DETAILED DESCRIPTION OF ILLUSTRATED EMBODIMENTS

The present invention will be further explained below in detail with reference to figures and embodiments. The embodiments described are to be regarded as illustrative rather than restrictive.

Figure 1:
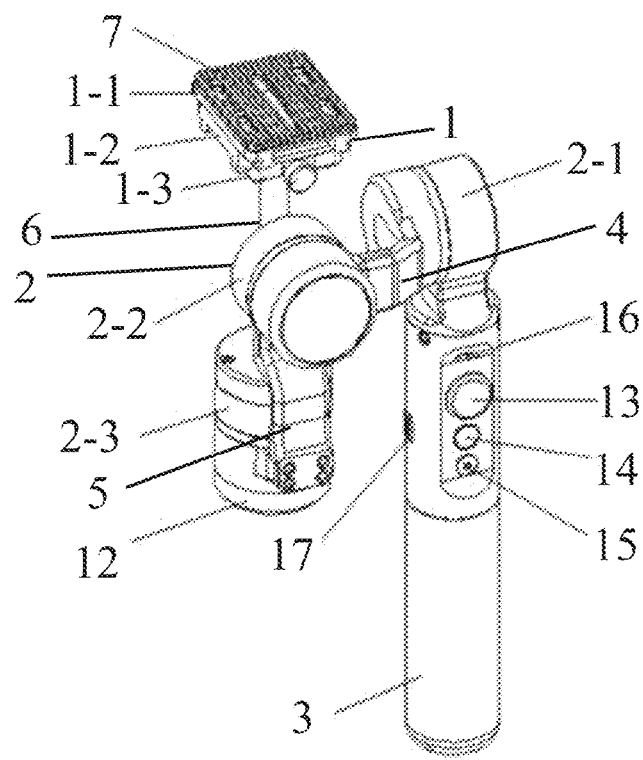
FIG. 1 is a schematic drawing of a panoramic camera stabilizer according to an embodiment of the present invention.

Referring to FIG. 1, a panoramic camera stabilizer according to a preferred embodiment of the present invention comprises a fixing assembly 1, a rotating component 2 and a handle 3, wherein the rotating component 2 is connected to an end of the handle 3, the fixing assembly 1 is connected with the rotating component 2 and is arranged above the rotating component 2, and the rotating component 2 comprises a first adjustment mechanism for adjusting a pitching angle of the fixing assembly, a second adjustment mechanism for adjusting a rolling angle of the fixing assembly, and a third adjustment mechanism for adjusting a yawing angle of the fixing assembly. The panoramic camera can be fixedly mounted above the fixing assembly 1 during use, so that the lens of the panoramic camera will not be blocked. Furthermore, by adjusting the pitching angle, rolling angle and yawing angle of the fixing assembly 1 by means of the rotating component 2, the panoramic camera may capture images at any angle.

The first adjustment mechanism comprises a pitching motor 2-1, the second adjustment mechanism comprises a rolling motor 2-2, and the third adjustment mechanism comprises a yawing motor 2-3. In order to optimize structure, the rotating component 2 may be L-shaped, wherein the handle 3 is fixedly connected with a stator of the pitching motor 2-1, a rotor of the pitching motor 2-1 is fixedly connected with a stator of the rolling motor 2-2 via a first connecting arm 4, a rotor of the rolling motor 2-2 is fixedly connected with a stator of the yawing motor 2-3 via a second connecting arm 5, a rotor of the yawing motor 2-3 is fixedly connected with the fixing assembly 1 via a third connecting arm 6. Preferably, the panoramic camera stabilizer further comprises a control unit. In particular, the control unit may comprise a posture board connected with the fixing assembly 1 for detecting the posture information of the fixing assembly 1, and a control board connected with the first adjustment mechanism, the second adjustment mechanism and the third adjustment mechanism, respectively, for controlling the movement postures of the first adjustment mechanism, the second adjustment mechanism and the third adjustment mechanism. In particular, the control board comprises a micro control unit and a motor control circuit, a magnetic encoder and a serial communication circuit which are connected with the micro control unit. During using, the magnetic encoder detects rotational angle and rate variation signals of the motors and sends these signals to the micro control unit through the serial communication circuit, then the micro control unit performs corresponding process according to the signals and controls the movement postures of the first adjustment mechanism, the second adjustment mechanism and the third adjustment mechanism through the motor control circuit.

Figure 2:
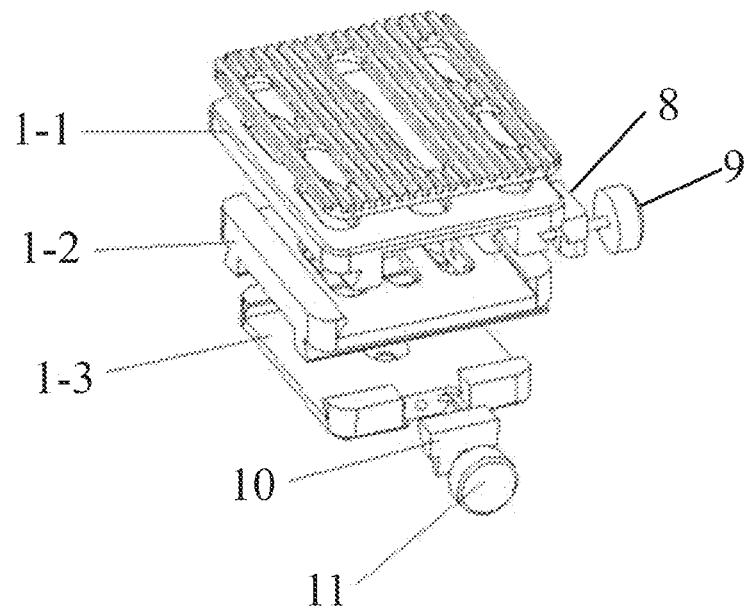
FIG. 2 is a schematic drawing of a fixing assembly according to an embodiment of the present invention.

Referring to FIG. 2, the fixing assembly 1 comprises a fixing mechanism 1-1, a longitudinal adjustment mechanism 1-2, and a transverse adjustment mechanism 1-3, wherein the fixing mechanism 1-1 comprises a fixing plate provided with a mounting groove for fixing the panoramic camera, wherein the mounting groove is provided with a through hole on the lateral side, and a fastening screw is arranged in the through hole for fixing. During using, the camera may be fixedly mounted above the fixing mechanism 1-1, and a skid-proof cushion 7 may also be arranged on the fixing mechanism in order to prevent the camera from sliding. In order to adjust the camera's position, the fixing mechanism 1-1 may longitudinally slide relative to the longitudinal adjustment mechanism 1-2, and the longitudinal adjustment mechanism 1-2 may transversely slide relative to the transverse adjustment mechanism 1-3, wherein the slidable mounting may be achieved by threads, a sliding block, a guide rail, a slide groove, or etc. In order to facilitate adjustment, the fixing mechanism 1-1 preferably is slidably mounted on a first recess at the top of the longitudinal adjustment mechanism 1-2, via a first guide rail at the bottom, and the longitudinal adjustment mechanism 1-2 is provided with a first locking block 8 and a first locking screw 9 for locking the first guide rail and the first recess, in particular, when the first guide rail is moved to a desired position relative to the first recess, it can be blocked by the first locking block 8 and locked by the first locking screw 9; the longitudinal adjustment mechanism 1-2 is slidably mounted on a second recess at the top of the transverse adjustment mechanism 1-3, via a second guide rail at the bottom, and the transverse adjustment mechanism 1-3 is provided with a second locking block 10 and a second locking screw 11 for locking the second guide rail and the second recess, in particular, when the second guide rail is moved to a desired position relative to the second recess, it can be blocked by the second locking block 10 and locked by the second locking screw 11.

Preferably, the stator of the yawing motor is fitted with a counterweight 12 by slot connection, rivet connection, threaded connection, or etc., preferably by threaded connection in order to facilitate removal and replacement. During using, a desired counterweight 12 may be mounted by a screw, and the center of gravity may be adjusted through the counterweight 12, the longitudinal adjustment mechanism 1-2 and the transverse adjustment mechanism 1-3, so as to facilitate mounting of panoramic cameras in different sizes and weights. In order to allow easy operation and adjustment, the handle 3 may be provided with a button board, a built-in battery, a four-direction navigation key 13, a function button 14, a shutter button 15, an indicator light 16, and a USB port 17.

Overall, the present invention provides a panoramic camera stabilizer, comprising a fixing assembly connected with a rotating component and arranged above it, so the view of the panoramic camera mounted on the fixing assembly will not be blocked. It provides a first adjustment mechanism for adjusting pitching angle of the fixing assembly, a second adjustment mechanism for adjusting rolling angle of the fixing assembly, and a third adjustment mechanism for adjusting yawing angle of the fixing assembly, enabling the panoramic camera to capture images at any angle. Furthermore, since the stabilizer is provided with a counterweight, the center of gravity may be adjusted through the counterweight and the fixing assembly, allowing mounting of panoramic cameras in different weights and sizes on the stabilizer.

All the above are merely the preferred embodiments of the present invention. It should be noted that, those skilled in the art may change or modify those without departing from the scope of the present invention, the present invention is intended to cover all changes, various modifications and equivalent arrangements included within the principle and scope of the present invention.

What is claimed is:

1. A panoramic camera stabilizer, comprising a fixing assembly, a rotating component and a handle, the fixing assembly is used for mounting a panoramic camera, the rotating component is connected to an end of the handle, the fixing assembly is connected with the rotating component and is arranged above the rotating component;
   the rotating component comprises:
   a first adjustment mechanism for adjusting a pitching angle of the fixing assembly;
   a second adjustment mechanism for adjusting a rolling angle of the fixing assembly; and
   a third adjustment mechanism for adjusting a yawing angle of the fixing assembly;
   the first adjustment mechanism comprises a pitching motor, the second adjustment mechanism comprises a rolling motor, and the third adjustment mechanism comprises a yawing motor, wherein a stator of the pitching motor is fixedly connected with the handle, a rotor of the pitching motor is fixedly connected with a stator of the rolling motor via a first connecting arm, a rotor of the rolling motor is fixedly connected with a stator of the yawing motor via a second connecting arm, a rotor of the yawing motor is fixedly connected with the fixing assembly via a third connecting arm;
   the stator of the yawing motor is fitted with a counterweight.

2. The panoramic camera stabilizer according to claim 1, characterized in that: the panoramic camera stabilizer further comprises a control unit for controlling movement postures of the first adjustment mechanism, the second adjustment mechanism and the third adjustment mechanism.

3. The panoramic camera stabilizer according to claim 1, characterized in that: the fixing assembly comprises a fixing mechanism, a longitudinal adjustment mechanism and a transverse adjustment mechanism, wherein the fixing mechanism is used for mounting the camera, the fixing mechanism is longitudinally slidable relative to the longitudinal adjustment mechanism, and the longitudinal adjustment mechanism is transversely slidable relative to the transverse adjustment mechanism.

4. The panoramic camera stabilizer according to claim 1, characterized in that: the rotating component is L-shaped.

5. The panoramic camera stabilizer according to claim 1, characterized in that: the handle is provided with a button board, a built-in battery, a four-direction navigation key, a function button, a shutter button, an indicator light, and a USB port.

6. The panoramic camera stabilizer according to claim 2, characterized in that: the control unit comprises a control board and a posture board, wherein the control board is connected with the first adjustment mechanism, the second adjustment mechanism and the third adjustment mechanism, respectively, the posture board is connected with the fixing assembly, the control board is used for controlling the movement postures of the first adjustment mechanism, the second adjustment mechanism and the third adjustment mechanism, and the posture board is used for detecting posture information of the fixing assembly.

7. The panoramic camera stabilizer according to claim 3, characterized in that: the fixing mechanism comprises a fixing plate provided with a mounting groove for fixing the panoramic camera, wherein the mounting groove is provided with a through hole on a lateral side, a fastening screw is arranged in the through hole, and the fixing plate is provided with a first guide rail at the bottom;
   the longitudinal adjustment mechanism comprises a longitudinal adjustment plate, the longitudinal adjustment plate is provided with a first recess for accommodating the first guide rail of the fixing plate, the longitudinal adjustment plate is provided on a lateral side with a first locking block and a first locking screw for locking the first guide rail and the first recess, and the longitudinal adjustment plate is provided with a second guide rail at the bottom;
   the transverse adjustment mechanism comprises a transverse adjustment plate, the transverse adjustment plate is provided with a second recess for accommodating the second guide rail of the longitudinal adjustment plate, the transverse adjustment plate is provided on a lateral side with a second locking block and a second locking screw for locking the second guide rail and the second recess.

8. The panoramic camera stabilizer according to claim 6, characterized in that: the control board comprises a micro control unit and a motor control circuit, a magnetic encoder and a serial communication circuit which are connected with the micro control unit, wherein the magnetic encoder is used for detecting rotational angle and rate variation signal of the motors and sending the signal to the micro control unit through the serial communication circuit, the micro control unit is used for performing corresponding process according to the signal and controlling the movement postures of the first adjustment mechanism, the second adjustment mechanism and the third adjustment mechanism through the motor control circuit.

* * * * *